(12) United States Patent
Livesay et al.

(10) Patent No.: US 9,175,539 B2
(45) Date of Patent: Nov. 3, 2015

(54) METHODS AND SYSTEMS FOR PRESSURE TESTING COMPONENTS OF A HYDROCARBON WELL SYSTEM

(75) Inventors: Ronald Livesay, Fort Worth, TX (US); Warren Winters, Cypress, TX (US)

(73) Assignee: BP Corporation North America Inc., Houston, TX (US)

( * ) Notice: Subject to any disclaimer, the term of this patent is extended or adjusted under 35 U.S.C. 154(b) by 721 days.

(21) Appl. No.: 13/476,270

(22) Filed: May 21, 2012

(65) Prior Publication Data

US 2013/0311097 A1 Nov. 21, 2013

(51) Int. Cl.
| | |
|---|---|
| *G01V 1/40* | (2006.01) |
| *E21B 33/035* | (2006.01) |
| *G01V 11/00* | (2006.01) |
| *E21B 33/064* | (2006.01) |
| *E21B 44/00* | (2006.01) |
| *E21B 47/06* | (2012.01) |
| *E21B 47/10* | (2012.01) |
| *G01M 3/28* | (2006.01) |

(52) U.S. Cl.
CPC ........... *E21B 33/0355* (2013.01); *E21B 33/064* (2013.01); *E21B 44/00* (2013.01); *E21B 47/06* (2013.01); *E21B 47/1025* (2013.01); *G01M 3/2815* (2013.01); *G01V 11/00* (2013.01)

(58) Field of Classification Search
None
See application file for complete search history.

(56) References Cited

U.S. PATENT DOCUMENTS

| | | | |
|---|---|---|---|
| 6,032,736 A | 3/2000 | Williams | |
| 7,401,654 B2 | 7/2008 | Franklin | |
| 7,706,980 B2 | 4/2010 | Winters et al. | |
| 8,756,022 B2 * | 6/2014 | Franklin | 702/51 |
| 2003/0000693 A1 * | 1/2003 | Couren et al. | 166/66 |
| 2008/0257544 A1 | 10/2008 | Thigpen et al. | |

FOREIGN PATENT DOCUMENTS

| | | |
|---|---|---|
| EP | 1270870 A1 | 1/2003 |
| WO | 2005080744 A1 | 9/2005 |

OTHER PUBLICATIONS

International Search Report and Written Opinion dated Oct. 30, 2013, issued in related International Application No. PCT/US2012/038795, filed May 21, 2012, 10 pages.

\* cited by examiner

*Primary Examiner* — Aditya Bhat
(74) *Attorney, Agent, or Firm* — John Poliak (57) ABSTRACT

A component of a well system can be tested by pressurizing the component of the well system a test pressure via two supply lines connected to the component of the well system, e.g. a choke line and a kill line. Then, a first of the two supply lines can be isolated from the second supply line and the component of the well system. The change in pressure can be measured in the first supply line and the change in pressure can be independently measured in the second supply line and the component of the well system. The change in pressure of the first supply line can be subtracted from the change in pressure of the second supply line and the component. Then, the change in pressure for the component can be analyzed to determine if the component of the well system is maintaining pressure integrity, i.e. leaking or not leaking.

33 Claims, 10 Drawing Sheets

METHODS AND SYSTEMS FOR PRESSURE TESTING COMPONENTS OF A HYDROCARBON WELL SYSTEM

FIELD

This disclosure relates generally to testing well systems.

DESCRIPTION OF THE RELATED ART

Safety is an important factor in hydrocarbon well systems, especially off-shore wells. Due to the environment impact and safety concerns, regulations exist that require testing of well systems to ensure that the well systems are operating properly. Current regulations require that the components of the well systems, such as the blowout preventers and the well casings, be tested regularly to ensure that the components are operating properly and not leaking. In typical testing, the choke line and an isolated component of the well system, for example a portion of the blowout preventer, are pressurized. The change in pressure is then monitored to determine if the change in pressure reaches a steady state, thus indicating that the component is not leaking.

This approach, however, presents several problems. In typical tests, the monitored change in the pressure includes both a change in pressure due to the choke line and the change in pressure due to the component of the well system. The choke line's contribution, however, can make it difficult to determine whether the change in pressure has reached a steady state. This is due to several factors. For example, the entire length of the choke line resides in highly varying environmental conditions, from the surface of the ocean to deep subsea conditions. These conditions introduce temperature and pressure effects to the choke line's contribution to the change in pressure during the pressure testing. These effects become more of a factor as the requirements for verifying a steady state in the pressure change, i.e. a non-leaking condition, become more rigorous.

Thus, there is need of a process by which components of a well system can be tested for pressure integrity that accounts for the contribution of the supply lines to the change in pressure during the pressure tests.

SUMMARY

Embodiments of the present teachings relate to systems and methods for testing the pressure integrity of different components of a well system. According to embodiments, a component of a well system can be tested by isolating the component of the well system, such as the wellhead or portions of the blowout preventer stack. Once isolated, the component of the well system can be pressurized to a test pressure via two supply lines connected to the component of the well system, e.g. a choke line and a kill line.

Once pressurized to the test pressure, a first of the two supply lines can be isolated from the second supply line and the component of the well system. Then, the change in pressure can be measured in the first supply line and the change in pressure can be independently measured in the second supply line and the component of the well system. Once measured, the change in pressure of the first supply line can be subtracted from the change in pressure of the second supply line and the component. By subtracting out the change in pressure of the first supply line that was isolated, the second supply line's contribution to the change in pressure can be removed and an accurate change in pressure for the component of the well system can be obtained. Then, the change in pressure for the component of the well system can be analyzed to determine if the component of the well system is maintaining pressure integrity, i.e. leaking or not leaking.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in, a limiting sense and the scope of the present teachings is defined by the appended claims and their equivalents.

Figure 1:
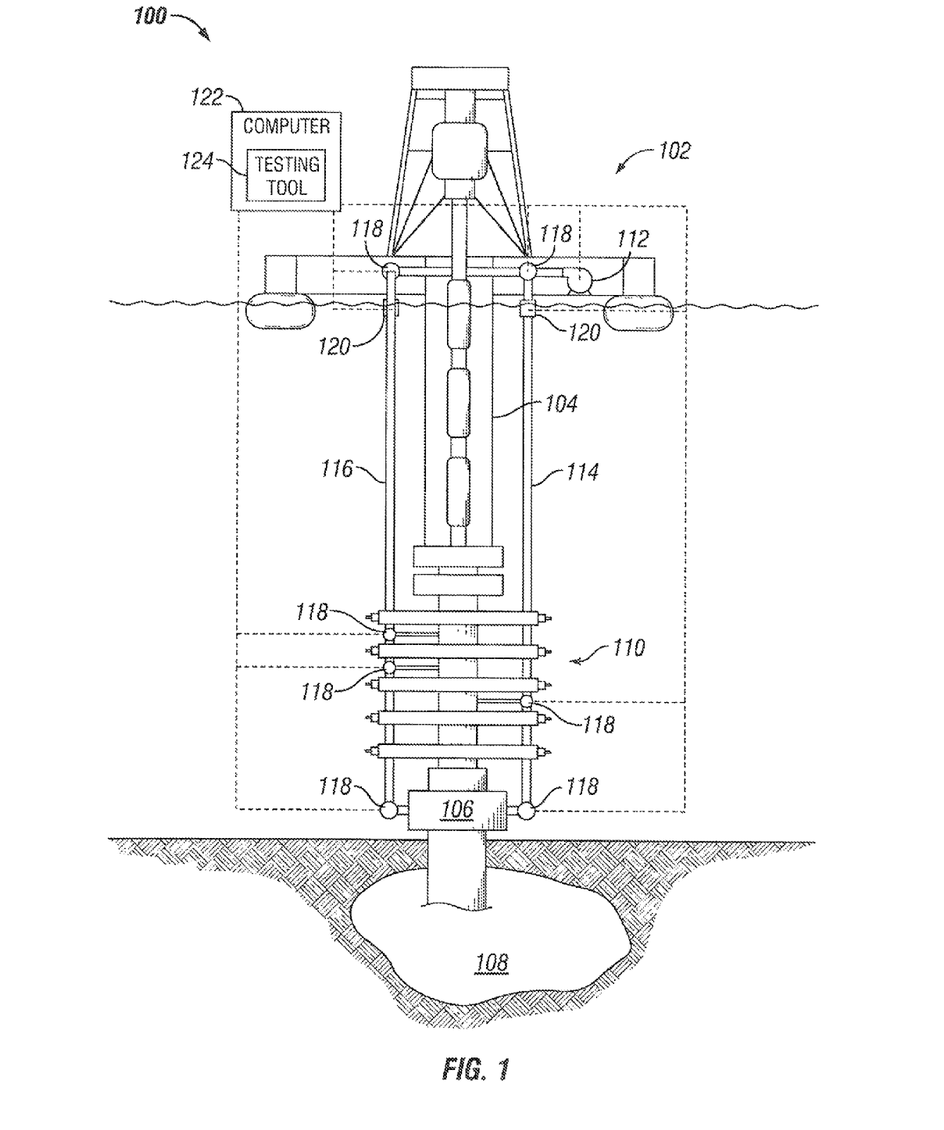
FIG. 1 is a generalized schematic diagram of a hydrocarbon well system, according to aspects of the present disclosure.

FIG. 1 illustrates an example of a hydrocarbon well system ("well system") 100 in which aspects of the disclosure can be performed. While FIG. 1 illustrates various components contained in the well system 100, one skilled in the art will realize that FIG. 1 is exemplary and that additional components can be added and existing components can be removed.

As illustrated in FIG. 1, the well system 100 can include a rig 102 that is coupled to a riser 104 and a wellhead 106 for extracting hydrocarbons, for example oil and/or gas, from a reservoir 108. The well system 100 can include a blowout preventer ("BOP") stack 110. The BOP stack 110 can include a series of valves 118 that can be closed in the event that the rig 102 loses control of fluids within the well system 100.

Likewise, the series of valves 118 within the BOP stack 110 can be opened and closed to perform other processes such as testing, maintenance, etc.

The well system 100 can also include a high pressure pump 112. The high pressure pump 112 can be coupled to the riser 104, the wellhead 106, and/or the BOP stack 110 by fluid supply lines, e.g. a choke line 114 and a kill line 116. During operation, the high pressure pump 112 can pump fluid down the kill line 116, which is returned via the choke line 114, in order to maintain pressure within the well system 100. Additionally, according to aspects of the disclosure, the high pressure pump 112, the choke line 114, and the kill line 116 can be utilized to perform pressure integrity tests on the components of the well system 100 as described below. To control the flow of fluid to the components of the well system 100, the choke line 114 and the kill line 116 can include the number of valves 118 that can be opened and closed to regulate the flow of fluid in the choke line 114 and the kill line 116. Likewise, the choke line 114 and the kill line 116 can include a number of pressure sensors 120 to measure the pressure of the fluid in the choke line 114 and the kill line 116.

To control the operation of the well system 100, the rig 102 can include a computer 122. The computer 122 can be electrically coupled to the components of the well system 100, such as the control systems of the BOP stack 110, the pump 112, the valves 118, the pressure sensors 120, and other control systems and sensors. The computer 122 can be electrically coupled to the components of the well system 100 using any type of known wired or wireless electrical communication pathways in order to control the operation of the components and receive data representing the operation of the well system 100.

According to aspects, the computer 122 can include a testing tool 124. The testing tool 124 can be configured to instruct the computer 122 to communicate with the components of the well system 100 to perform pressure integrity tests on the components of the well system 100. The testing tool 124 can be configured as an application program that is capable of being stored on and executed by the computer 122. Likewise, the testing tool 124 can be configured as a software module that is part of other application programs executing on the computer 122. In any example, the testing tool 124 can be written in a variety of programming languages, such as JAVA, C++, Python code, Visual Basic, HTML, XML, and the like to accommodate a variety of operating systems, computing system architectures, etc.

According to aspects, the computer 122 can be configured to execute the testing tool 124 to perform the pressure integrity testing on components of the well system 100. To perform pressure integrity testing, the computer 122 can isolate a component of a well system 100, such as the wellhead 106 or portions of the BOP stack 110. Once isolated, the computer 122 can pressurize, utilizing the high pressure pump 112, the component of the well system 100 and the supply lines, e.g. a choke line 114 and a kill line 116, to a test pressure.

Once pressurized to the test pressure, the computer 122 can isolate one of the supply lines, e.g. the kill line 116, from the other supply line, e.g. the choke line 114, and the component of the well system 100 by closing the valves 118 for the kill line 116. Then, the computer 122 can measure the change in pressure in the kill line 116 over a period of time by communicating with the pressure sensor 120 in the kill line 116. The computer 122 can independently measure the change in pressure in the choke line 114 and component of the well system by communicating with the sensor 120 in the choke line 114. Once measured, the computer 122 can subtract the change in pressure of the kill line 116 from the change in pressure of the choke line 114 and the component of the well system 100.

By subtracting the change in pressure of the kill line 116 that was isolated, the choke line's 114 contribution to the change in pressure measured for the component of the well system 100 and the choke line 114 can be removed. Thereby, the computer 116 can obtain an accurate change in pressure for the component of the well system 100 that does not include the contribution of the choke line 114. Then, the computer 122 can analyze the change in pressure for the component of the well system 100, without the contribution from the choke line 114, to determine if the component of the well system 100 is maintaining pressure integrity, i.e. leaking or not leaking.

While FIG. 1 illustrates one example of a well system 100 including a BOP stack 110, one skilled in the art will realize that this is one example and the embodiments of the disclosure described herein can be utilized with any type of well system and BOP stack. For example, the well system 100 and BOP stack 110 can include different components and can be arranged in different configurations. Moreover, while embodiments of the disclosure are described herein with reference to the choke line 114 and the kill line 116, one skilled in the art will realize that process and procedures described herein can be performed on any types of pressure supply lines within a well system.

Figure 2:
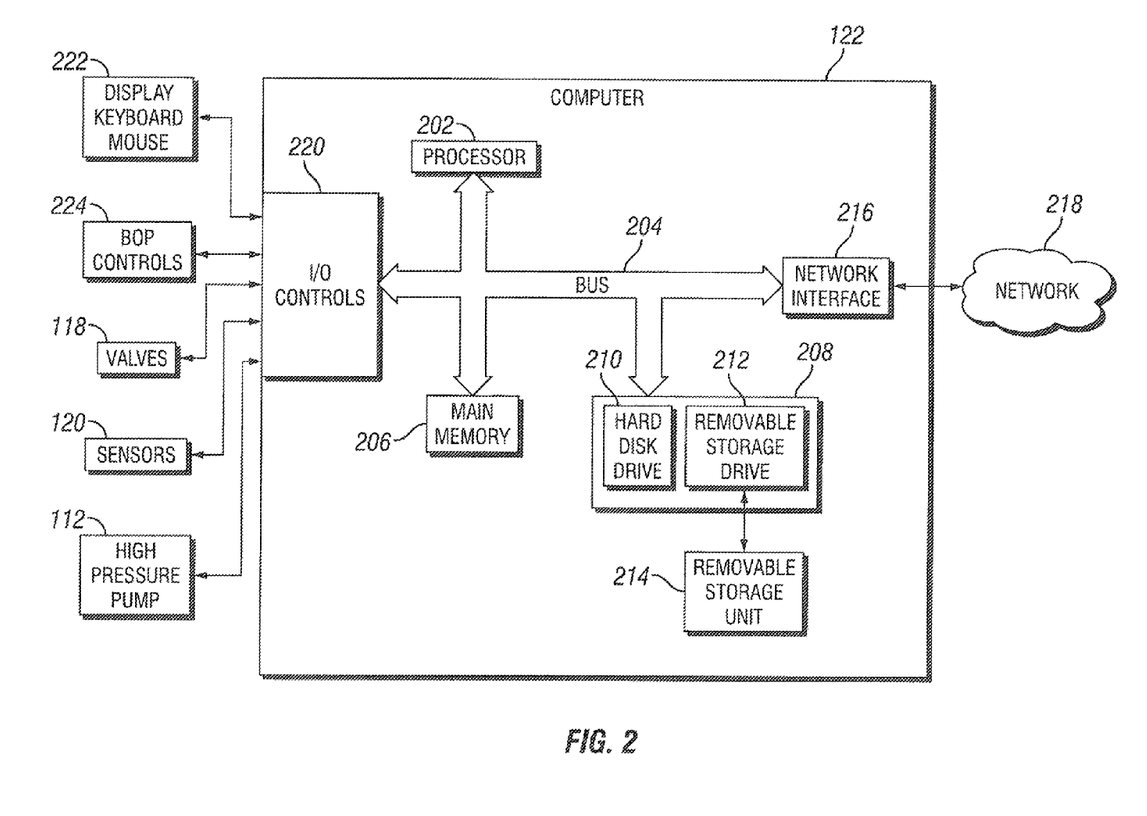
FIG. 2 is a generalized schematic diagram of a computer that includes a testing tool, according to aspects of the present disclosure.

FIG. 2 is a general schematic diagram of the computer 122 that can be utilized to perform the pressure integrity testing, according to aspects of the disclosure. In aspects, the testing tool 124 can be stored and executed on the computer 122 in order to perform the process described below. While FIG. 2 illustrates various components contained in the computer 122, one skilled in the art will realize that FIG. 2 is exemplary and that additional components can be added and existing components can be removed.

As shown in FIG. 2, the computer 122 can include one or more processors, such as a processor 202, which can provide an execution platform for embodiments of the testing tool 124. Commands and data from the processor 202 are communicated over a communication bus 204. The computer 122 can also include a main memory 206, for example, one or more computer readable storage media such as a Random Access Memory (RAM), where the testing tool 124 and/or other application programs, such as an operating system (OS) can be stored and executed during runtime. The computer 122 can also include a secondary memory 208. The secondary memory 208 can include, for example, one or more computer readable storage media or devices such as a hard disk drive 210 and/or a removable storage drive 212, representing a floppy diskette drive, a magnetic tape drive, a compact disk drive, etc., where a copy of an application program embodiment for the testing tool 124 and/or other application programs, such as the OS, can be stored. The removable storage drive 212 reads from and/or writes to a removable storage unit 214 in a well-known manner. The computer 122 can also include a network interface 216 in order to connect with any type of network 218, whether wired or wireless.

The computer 122 can also include one or more input/output interfaces 220 coupled to the communications bus 204. The one or more input/output interfaces 220 can be any type of conventional input/output interfaces, such as Universal Serial Bus ("USB"), Firewire™, Bluetooth™, serial interfaces, parallel interfaces, graphics interfaces, and the like. In embodiments, a user can interface with the computer 122 and operate the testing tool 124 with one or more input/output devices coupled to the input/output interfaces 220, such as a display, keyboard, mouse, etc.

In aspects, BOP controls 224, the valves 118, the sensors 120, and the high pressure pump 112 can be coupled to the input/output interfaces 220. To perform the pressure integrity testing, the testing tool 124 can be configured to instruct the computer 122 to communicate with the BOP controls 224, the valves 118, the sensors 120, and the high pressure pump 112 via the input/output interfaces 220.

Figure 3:
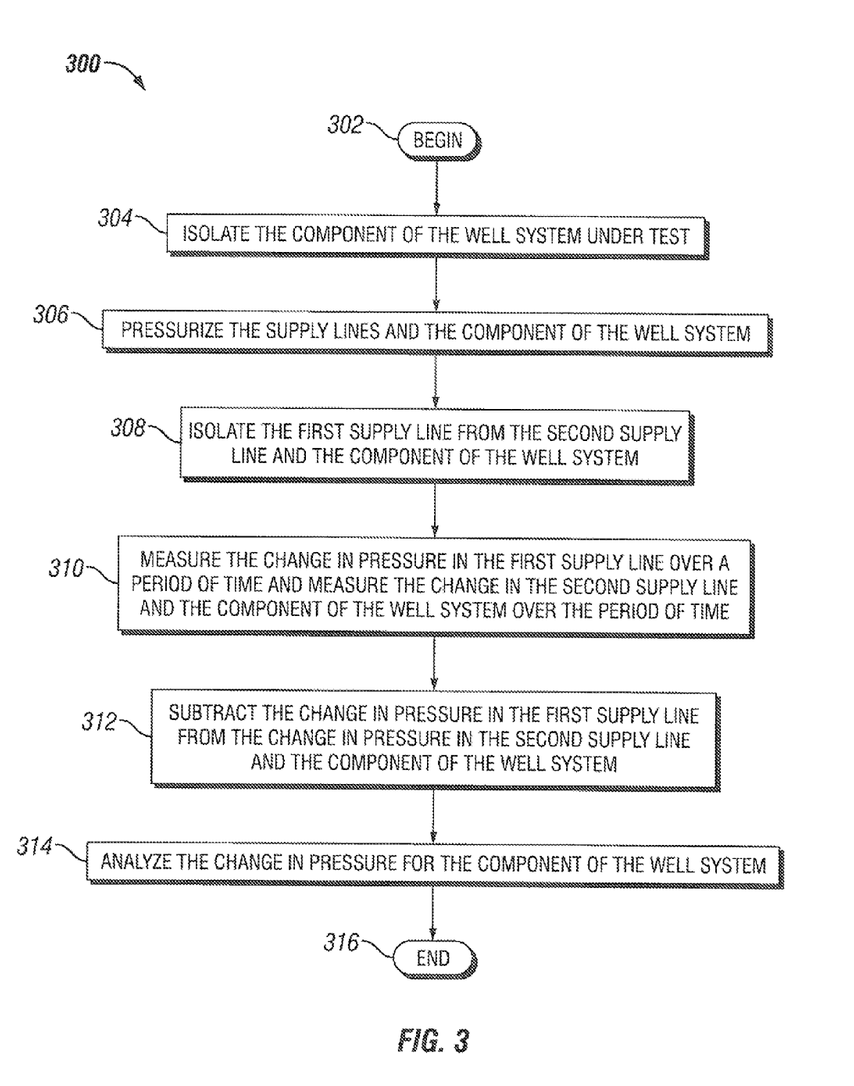
FIG. 3 is a flowchart that illustrates an exemplary process for testing the pressure integrity of components of a well system, according to aspects of the present disclosure.
Figure 4A:
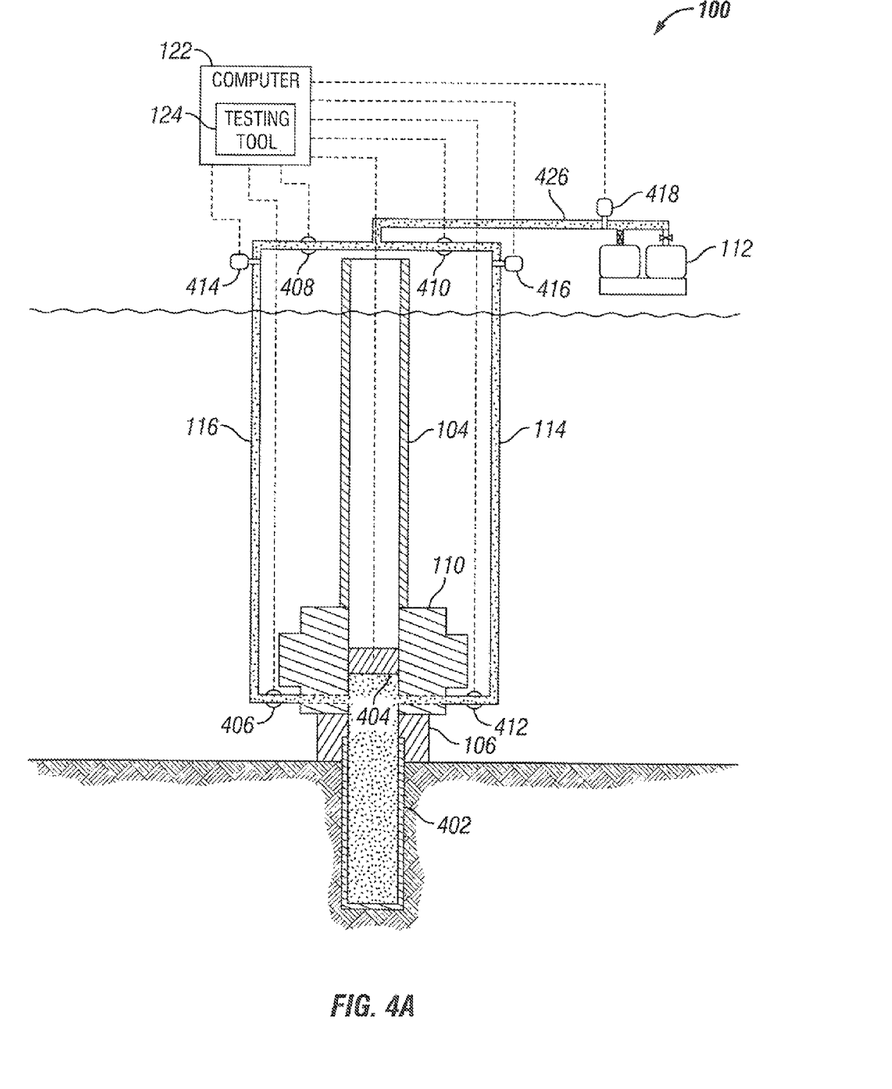
FIGS. 4A-4C are generalized schematic diagrams that illustrate an exemplary testing process for a wellhead, according to aspects of the disclosure.
Figure 4B:
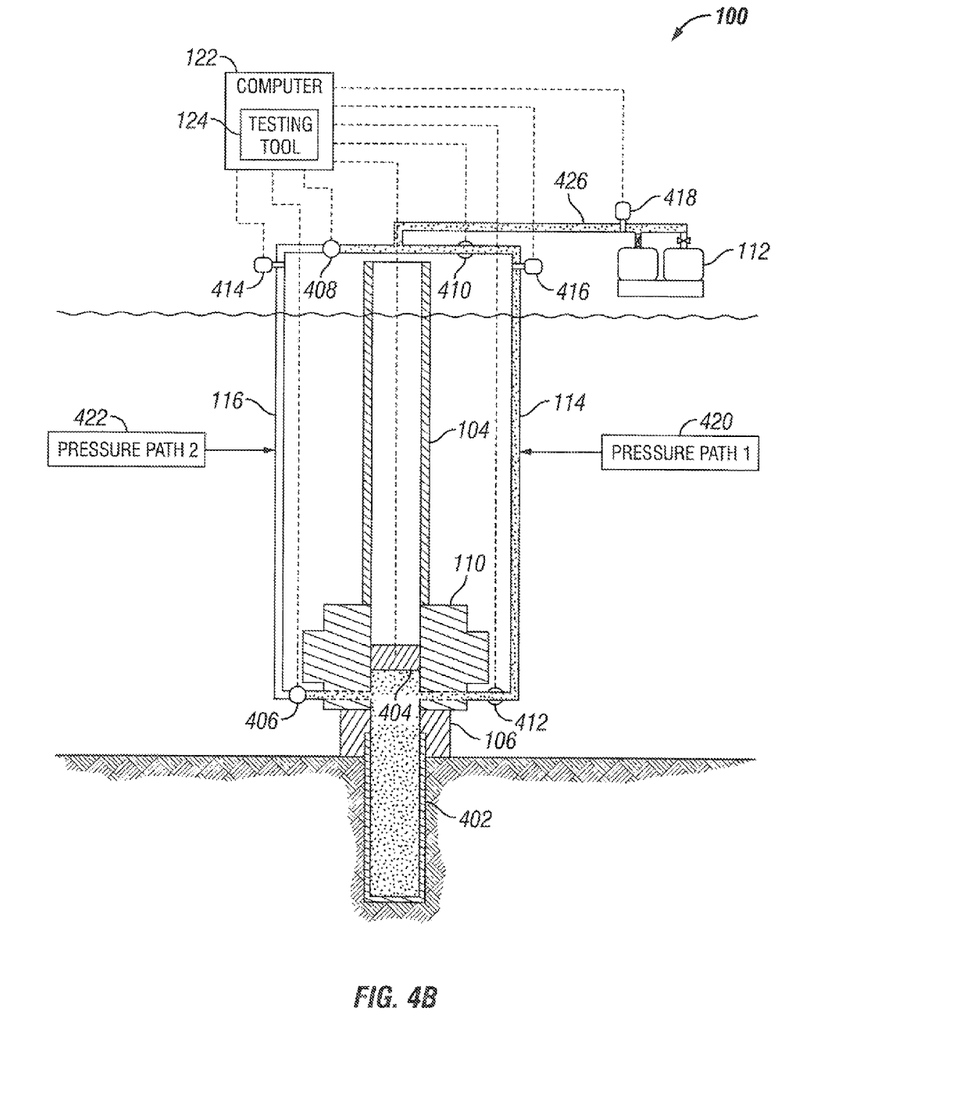
Figure 4C:
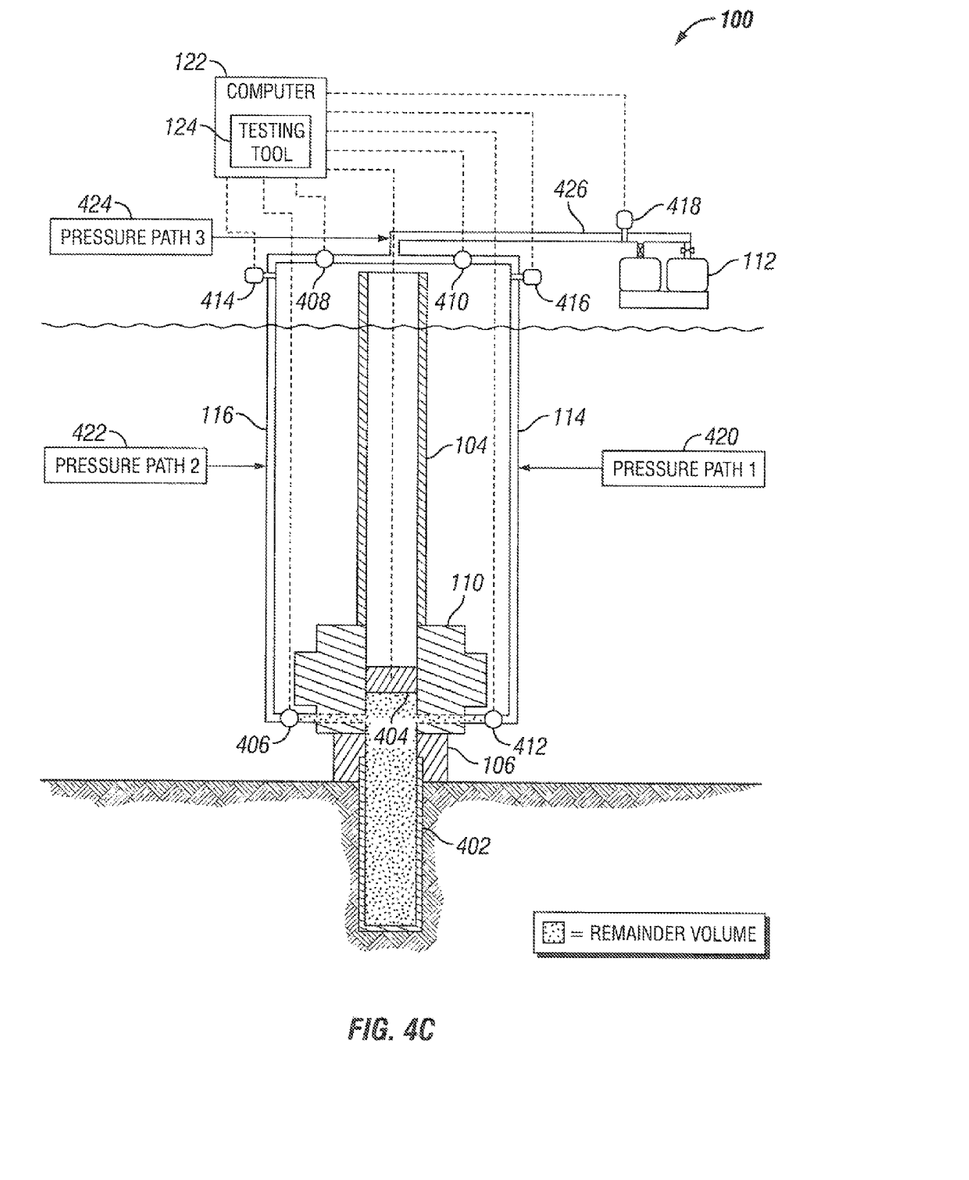

As described above, the computer 122, executing the testing tool 124, can perform pressure integrity testing on the components of the well system 100. FIG. 3 is a flow diagram that illustrates an exemplary process 300 for testing components of the well system 100, for example, testing the wellhead 106 of the well system 100 as illustrated in FIGS. 4A-4C. While FIGS. 4A-4C illustrate only a portion of well system 100 necessary to describe the process 300, one skilled in the art will realize that well system 100 can include any known components of a well system, for example, the components illustrated in FIG. 1.

In 302, the process can begin. For example, as illustrated in FIG. 4A, a user can desire to test the pressure integrity of the well casing 402 of the wellhead 106. For instance, a user operating the testing tool 124 on the computer 122 can initiate the pressure integrity testing on the wellhead 106. Likewise, for instance, the computer 122, executing the testing tool 124, can be configured to automatically initiate the pressure integrity testing on the wellhead 106, whether at a defined time or periodically.

In 304, the computer 122 can isolate the component of the well system 100 under test. For example, as illustrated in FIG. 4A, the computer 122, executing the testing tool 124, can communicate with the BOP controls 224 to close the blind rams 404 in the BOP stack 110. By closing the blind rams 404, the wellhead 106 can be isolated from the BOP stack 110 and the riser 104.

In 306, the computer 122 can pressurize the supply lines and the component of the well system 100. For example, as illustrated in FIG. 4A, the computer 122, executing the testing tool 124, can communicate with the high pressure pump 112 to pressurize the choke line 114, the kill line 116, and the wellhead 106 to a test pressure. In embodiments, the choke line 114, the kill line 116, and the wellhead 106 can be pressurized to a pressure adequate to test the well casing 402 while maintaining safe operating pressures in the well system 100.

In 308, the computer 122 can isolate a first supply line from the second supply line and the component of the well system 100. For example, as illustrated in FIG. 4B, the computer 122, executing the testing tool 124, can close a kill valve 406 and a kill valve 408 in the kill line 116. By closing the kill valve 406 and the kill valve 408, the kill line 116 can be isolated from the choke line 114 and the wellhead 106, thereby forming pressure path "1" 420 in the choke line 114 and the wellhead 106, and forming pressure path "2" 422 in the kill line 116.

Alternatively, as illustrated in FIG. 4C, in addition to closing the kill valve 406 and the kill valve 408, the computer 122, executing the testing tool 124, can also close a choke valve 410 while leaving a choke valve 412 open. By closing the choke valve 410, the choke line 114 and the wellhead 106 can be further isolated from a pipe manifold 426, thereby forming pressure path "3" 424 that is isolated from both the pressure path "1" 420 and the pressure path "2" 422.

In 310, the computer 122 can measure the change in pressure from the test pressure in the first supply line over a period of time and can independently measure the change in pressure from the test pressure in the second supply line and the component of the well system 100 over the period of time. For example, as illustrated in FIG. 4B or FIG. 4C, the computer 122, executing the testing tool 124, can communicate with a pressure sensor 414 in the kill line 116 to measure the change in the pressure in the pressure path "2" 422 over the period of time. Likewise, the computer 122, executing the testing tool 124 can communicate with a pressure sensor 416 in the choke line 114 to measure the change in pressure in the pressure path "1" 420, that includes the wellhead 106, over the period of time. In embodiments, the period of time for which the change in pressure is measured can be any adequate time period to determine if the change in pressure reaches a steady state and/or any adequate time period to extrapolate whether the change in pressure will reach a steady state.

In 312, the computer 122 can subtract the change in the pressure in the first supply line from the change in the pressure in the second supply line and the component of the well system 100. For example as illustrated in FIG. 4B or 4C, because the pressure path "2" 422 represents similar dimensions and similar operating conditions as the choke line 114 in the pressure path "1" 420, when the change in pressure from the pressure path "2" 422 is subtracted from the change in pressure for pressure path "1" 420, the resulting change in pressure represents the change in pressure for the remainder volume 428 that includes the wells casing 402.

In 314, the computer 122 can analyze the change in pressure for the component of the well system 100. For example, the computer 122, executing the testing tool 124, can perform any type of data analysis and/or fitting to determine whether the change in pressure representing the remainder volume 428 reaches a steady state within accepted tolerances. Likewise, the computer 122, executing the testing tool 124, can perform other types of analysis on the change in pressure for the remainder volume 428 to determine whether the well casing 402 is leaking. For example, the computer 122, executing the testing tool 124, can perform analysis described in U.S. Pat. No. 7,706,980 to Winters et al., the entirety of which is incorporated herein by reference.

In 316, the process can end, return to any point or repeat.

While not described above, the computer 122, executing the testing tool 124, can perform other processes on the data gathered during the pressure integrity testing, e.g. the data representing the change in pressure in the pressure path "1" 420, the data representing the change in the pressure path "2" 422, and the data representing the change in the remainder volume 428. For example, the computer 122 can store a copy of the data gathered during the pressure integrity testing in a computer readable storage medium associated with the computer 122. For instance, the computer 122 can store a copy of the data gathered during the pressure integrity testing in the main memory 206, the secondary memory 208, and/or other remote computer readable storage media that can be connected to the computer 122 via the network 218.

Likewise, the computer 122 can provide the data gathered during pressure integrity testing to other computer systems connected to the computer 122 via the network 218. Additionally, the computer 122 can display the data gathered during the integrity testing in a graphical form on a display associated with the computer 122.

Figure 5A:
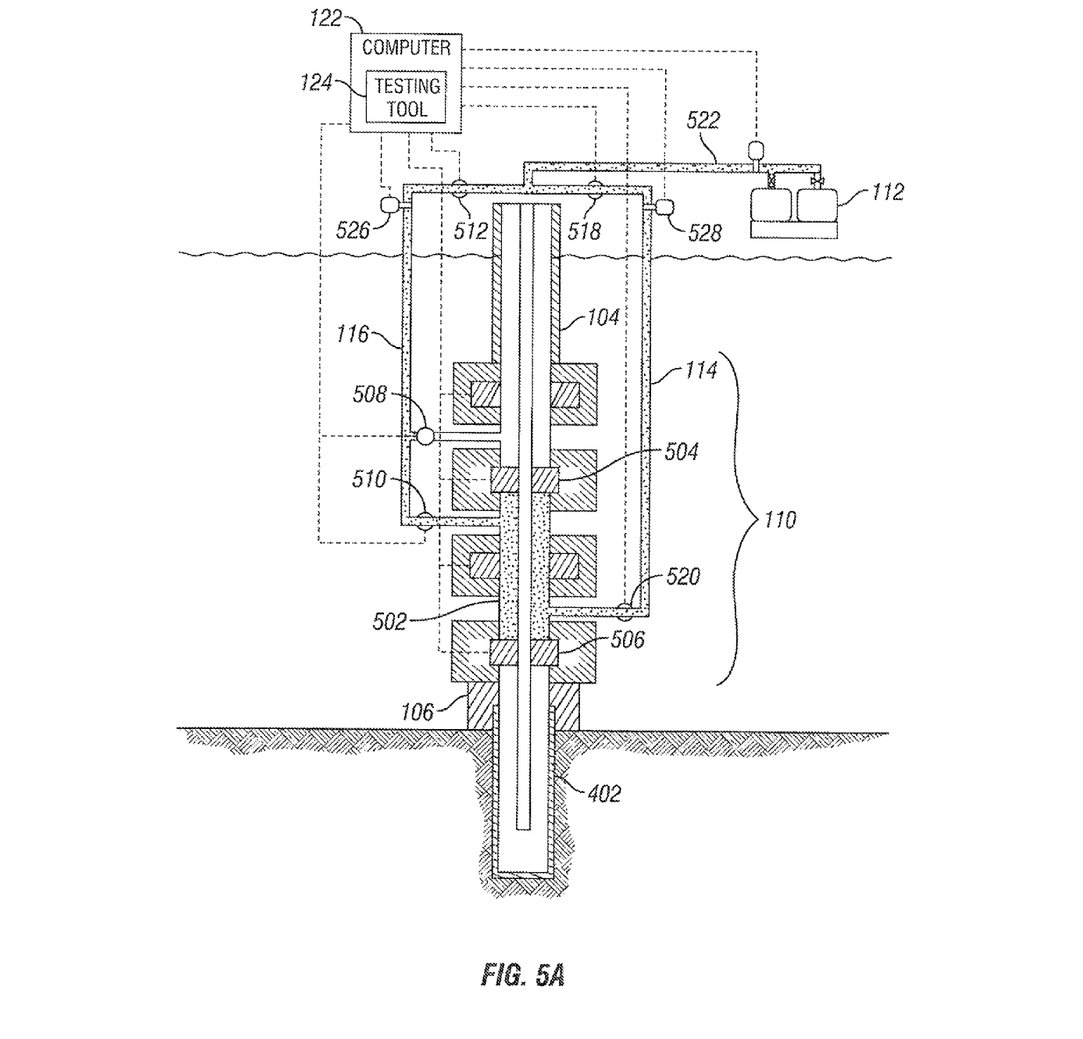
FIGS. 5A and 5B are generalized schematic diagrams that illustrate an exemplary testing process for a portion of a blowout preventer stack, according to aspects of the disclosure.
Figure 5B:
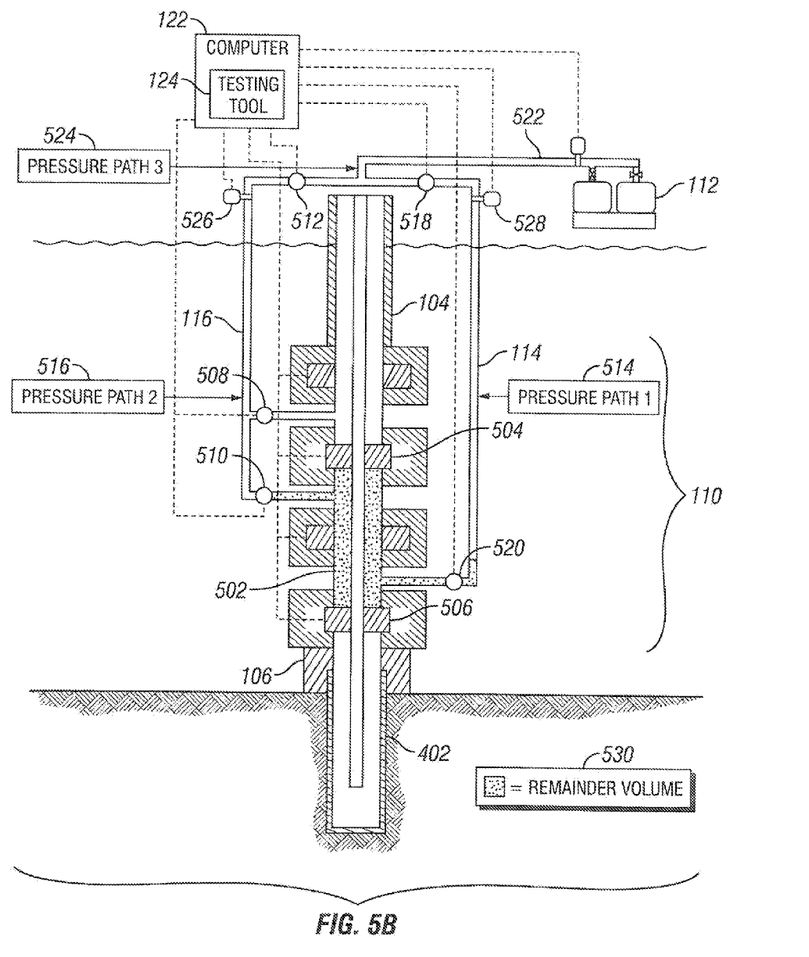

As described above, the process 300 can be utilized to pressure integrity test the wellhead 106 of the well system 100. Likewise, the process 300 can be utilized to pressure integrity test any other component of the well system 100. FIGS. 5A and 5B illustrate the process 300 being performed for a portion of the BOP stack 110. While FIGS. 5A and 5B illustrate only a portion of well system 100 necessary to describe the process 300, one skilled in the art will realize that well system 100 can include any known components of a well system, for example, the components illustrated in FIG. 1.

In 302, the process can begin. For example, as illustrated in FIG. 5A, a user can desire to test the pressure integrity of a portion 502 of the BOP stack 110, e.g. the pipe ram 504. For instance, a user operating the testing tool 124 on the computer 122 can initiate the pressure integrity testing on the portion 502 of the BOP stack 110. Likewise, for instance, the computer 122, executing the testing tool 124, can be configured to automatically initiate the pressure integrity testing on the portion 502 of the BOP stack 110, whether at a defined time or periodically.

In 304, the computer 122 can isolate the component of the well system 100 under test. For example, as illustrated in FIG. 5A, the computer 122, executing the testing tool 124, can communicate with the BOP controls 224 to close a pipe ram 504 and an inverted test ram 506 in the BOP stack 110 and a kill valve 508. By closing the pipe ram 504 and the inverted test ram 506 in the BOP stack 110 and the kill valve 508, the portion 502 of the BOP stack 110 can be isolated from the remainder of the BOP stack 110.

In 306, the computer 122 can pressurize the supply lines and the component of the well system 100. For example, as illustrated in FIG. 5A, the computer 122, executing the testing tool 124, can communicate with the high pressure pump 112 to pressurize the choke line 114, the kill line 116, and the portion 502 of the BOP stack 110. In aspects, the choke line 114, the kill line 116, and the portion 502 of the BOP stack 110 can be pressurized to a pressure adequate to test the pipe ram 504 and the inverted test ram 506 while maintaining safe operating pressures in the well system 100.

In 308, the computer 122 can isolate a first supply line from the second supply line and the component of the well system 100. For example, as illustrated in FIG. 5B, the computer 122, executing the testing tool 124, can close a kill valve 510 and a kill valve 512 on the kill line 116. By closing the kill valve 510 and the kill valve 512, the kill line 116 can be isolated from the choke line 114 and the portion 502 of the BOP stack 110, thereby forming pressure path "1" 514 in the choke line 114 and the portion 502 of the BOP stack 110, and forming pressure path "2" 516 in the kill line 116. Optionally, as illustrated in FIG. 5B, in addition to closing the kill valve 510 and the kill valve 512, the computer 122, executing the testing tool 124, can also close a choke valve 518 while leaving a choke valve 520 open. By closing the choke valve 518, the choke line 114 and the portion 502 of the BOP stack 110 can be further isolated from a pipe manifold 522, thereby forming pressure path "3" 524 that is isolated from both the pressure path "1" 514 and the pressure path "2" 516.

In 310, the computer 122 can measure the change in pressure from the test pressure in the first supply line over a period of time and can independently measure the change in pressure from the test pressure in the second supply line and the component of the well system 100 over the period of time. For example, as illustrated in FIG. 5B, the computer 122, executing the testing tool 124, can communicate with a pressure sensor 526 in the kill line 116 to measure the change in the pressure in the pressure path "2" 516 over the period of time. Likewise, the computer 122, executing the testing tool 124 can communicate with a pressure sensor 528 in the choke line 114 to measure the change in pressure in the pressure path "1" 514, that includes the portion 502 of the BOP stack 110, over the period of time. In embodiments, the period of time for which the change in pressure is measured can be any adequate time period to determine if the change in pressure reaches a steady state and/or any adequate time period to extrapolate whether the change in pressure will reach a steady state.

In 312, the computer 122 can subtract the change in the pressure in the first supply line from the change in the pressure in the second supply line and the component of the well system 100. For example as illustrated in FIG. 5B, because the pressure path "2" 516 represents similar dimensions and similar operating conditions as the choke line 114 in the pressure path "1" 514, when the change in pressure from the pressure path "2" 516 is subtracted from the change in pressure for pressure path "1" 514, the resulting change in pressure represents the change in pressure for the remainder volume 530 that includes the portion 502 of the BOP stack 110.

In 314, the computer 122 can analyze the change in pressure for the component of the well system 100. For example, the computer 122, executing the testing tool 124, can perform any type of data analysis and/or fitting to determine whether the change in pressure representing the remainder volume 530 reaches steady state within accepted tolerances. Likewise, the computer 122, executing the testing tool 124, can perform other types of analysis on the change in pressure for the remainder volume 530 to determine whether the portion 502 of the BOP stack 110 is leaking. For example, the computer 122, executing the testing tool 124, can perform analysis described in U.S. Pat. No. 7,706,980 to Winters et al., the entirety of which is incorporated herein by reference.

In 316, the process can end, return to any point or repeat.

In any of the examples described above, the test pressures utilized and the period of time for monitoring the pressure can depend on the well system or BOP component under test. For example, when testing BOP components, a low-pressure test and a high-pressure test can be performed. For the low-pressure test, the choke line 114, the kill line 116, and the BOP component can be pressurized to a test pressure in a range of approximately 200 psi to approximately 300 psi. For the high-pressure test, the test pressure can depend on the particular component of the BOP under test. For example, for ram-type BOPs, choke manifolds, and other BOP components, the high pressure test can be approximate equal to the rated working pressure of the equipment or approximately equal to the maximum anticipated pressure in the well interval. Likewise, for example, for annular-type BOPs, the high pressure test can be approximately equal to 70 percent of the rated working pressure of the equipment. For instance, annular BOPs can have a rated working pressure of approximately 5,000 psi, approximately 7,500 psi, or approximately 10,000 psi.

Additionally, when testing casing and/or liners, different test pressures can be utilized, for example, between approximately 200 psi to approximately 7,500 psi. For example, when testing drive or structural casing types, the choke line 114, the kill line 116, and the casing can be pressurized to any minimum test pressure. Likewise, for example, when testing conductor casing types, the choke line 114, the kill line 116, and the casing can be pressurized to a minimum test pressure of approximately 200 psi. Likewise, for example, when testing surface, intermediate, and production casing types, the choke line 114, the kill line 116, and the casing can be pressurized to a minimum test pressure of approximately 70 percent of the casing's minimum internal yield.

Additionally, for example, when testing drilling liner and liner-lap, the choke line 114, the kill line 116, and the liner can be pressurized to a test pressure approximately equal to the anticipated pressure which the liner will be subjected during the formation pressure-integrity test below that liner shoe or subsequent liner shoe. Likewise, for example, when testing production liner and liner-lap, the choke line 114, the kill line 116, and the liner can be pressurized to a minimum test pressure of approximately 500 psi above the formation fracture pressure at the casing shoe into which the liner is lapped. In any of the above examples, the operator of the computer 122 can set the test pressure to any desired test pressure.

In any of the above examples, the period of time for which the change in pressure is measured can be any adequate time period to determine if the change in pressure reaches a steady state and/or any adequate time period to extrapolate whether the change in pressure will reach a steady state. For example, the period of time can range from approximately 10 minutes to approximately 90 minutes.

While not described above, the computer 122, executing the testing tool 124, can perform other processes on the data gathered during the pressure integrity testing, e.g. the data representing the change in pressure in the pressure path "1" 514, the data representing the change in the pressure path "2" 516, and the data representing the change in the remainder volume 530. For example, the computer 122 can store a copy of the data gathered during the pressure integrity testing in a computer readable storage medium associated with the computer 122. For instance, the computer 122 can store a copy of the data gathered during the pressure integrity testing in the main memory 206, the secondary memory 208, and/or other remote computer readable storage media that can be connected to the computer 122 via the network 218.

Likewise, the computer 122 can provide the data gathered during pressure integrity testing to other computer systems connected to the computer 122 via the network 218. Additionally, the computer 122 can display the data gathered during the integrity testing in graphical form on a display associated with the computer 122.

In the process 300 as described above, the computer 122, executing the testing tool 124, can perform the subtraction and analyzing as the data, representing the change in pressure, is received from the sensors in the well system 100. Likewise, the computer 122 can capture the data, representing the change in pressure, and store the data for later subtraction and analysis.

Figure 6:
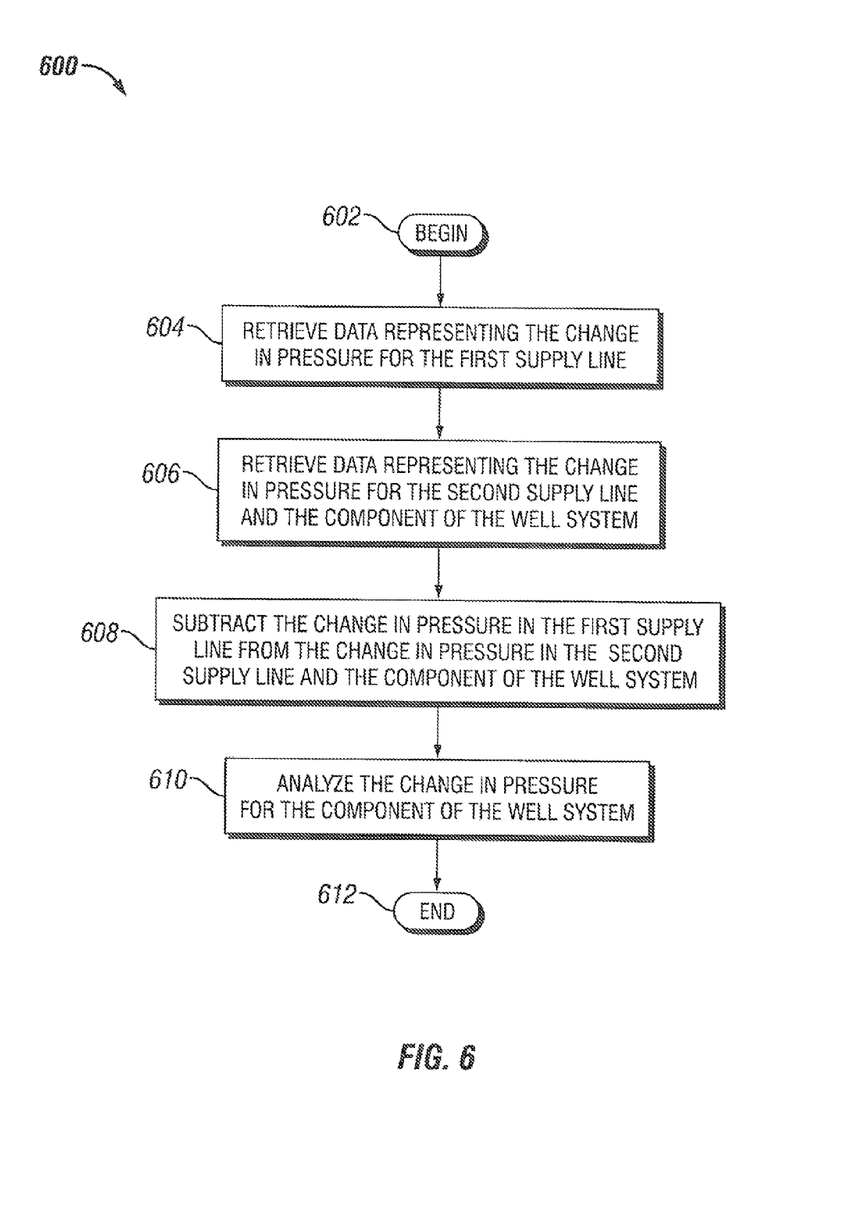
FIG. 6 is a flowchart that illustrates another exemplary process for testing the pressure integrity of components of a well system, according to aspects of the present disclosure.

FIG. 6 is a flow diagram that illustrates another exemplary process 600 for testing components of the well system 100, for example, testing the wellhead 106 of the well system 100 as illustrated in FIGS. 4A-4C. While FIG. 6 is described with reference to FIGS. 4A-4C, one skilled in the art will realize that the exemplary process can be performed on any component of the well system 100, for example, the components illustrated in FIGS. 5A and 5B.

In 602, the process can begin. In 604, the computer 122, executing the testing tool 124, can retrieve data representing the change in pressure in the pressure path "2" 422 from a computer readable storage medium associated with the computer 122. For example, the computer readable storage medium can be the main memory 206, the secondary memory 208, and/or other remote computer readable storage media that can be connected to the computer 122 via the network 218.

In 606, the computer 122, executing the testing tool 124, can retrieve data representing the change in pressure in the pressure path "1" 422 from a computer readable storage medium associated with the computer 122. For example, the computer readable storage medium can be the main memory 206, the secondary memory 208, and/or other remote computer readable storage media that can be connected to the computer 122 via the network 218.

In 608, the computer 122, executing the testing tool 124, can subtract the change in the pressure in the first supply line from the change in the pressure in the second supply line and the component of the well system 100. For example as illustrated in FIG. 4B or 4C, because the pressure path "2" 422 represents similar dimensions and similar operating conditions as the choke line 114 in the pressure path "1" 420, when the change in pressure from the pressure path "2" 422 is subtracted from the change in pressure for pressure path "1" 420, the resulting change in pressure represents the change in pressure for the remainder volume 428 that includes the wells casing 402.

In 610, the computer 122, executing the testing tool 124, can analyze the change in pressure for the component of the well system 100. For example, the computer 122, executing the testing tool 124, can perform any type of data analysis and/or fitting to determine whether the change in pressure representing the remainder volume 428 reaches steady state within accepted tolerances. Likewise, the computer 122, executing the testing tool 124, can perform other types of analysis on the change in pressure for the remainder volume 428 to determine whether the well casing 402 is leaking. For example, the computer 122, executing the testing tool 124, can perform analysis described in U.S. Pat. No. 7,706,980 to Winters et al., the entirety of which is incorporated herein by reference.

In 612, the process can end, return to any point or repeat.

According to aspects, the computer 122, executing the testing tool 124, can be configured to individually test the supply lines, e.g. the choke line 114 and the kill line 116 for leaks prior to performing the pressure integrity testing described. The computer 122, executing the testing tool 124, can be configured to perform the processes described in U.S. Pat. No. 7,706,980 to Winters et al., the entirety of which is incorporated herein by reference.

Figure 7:
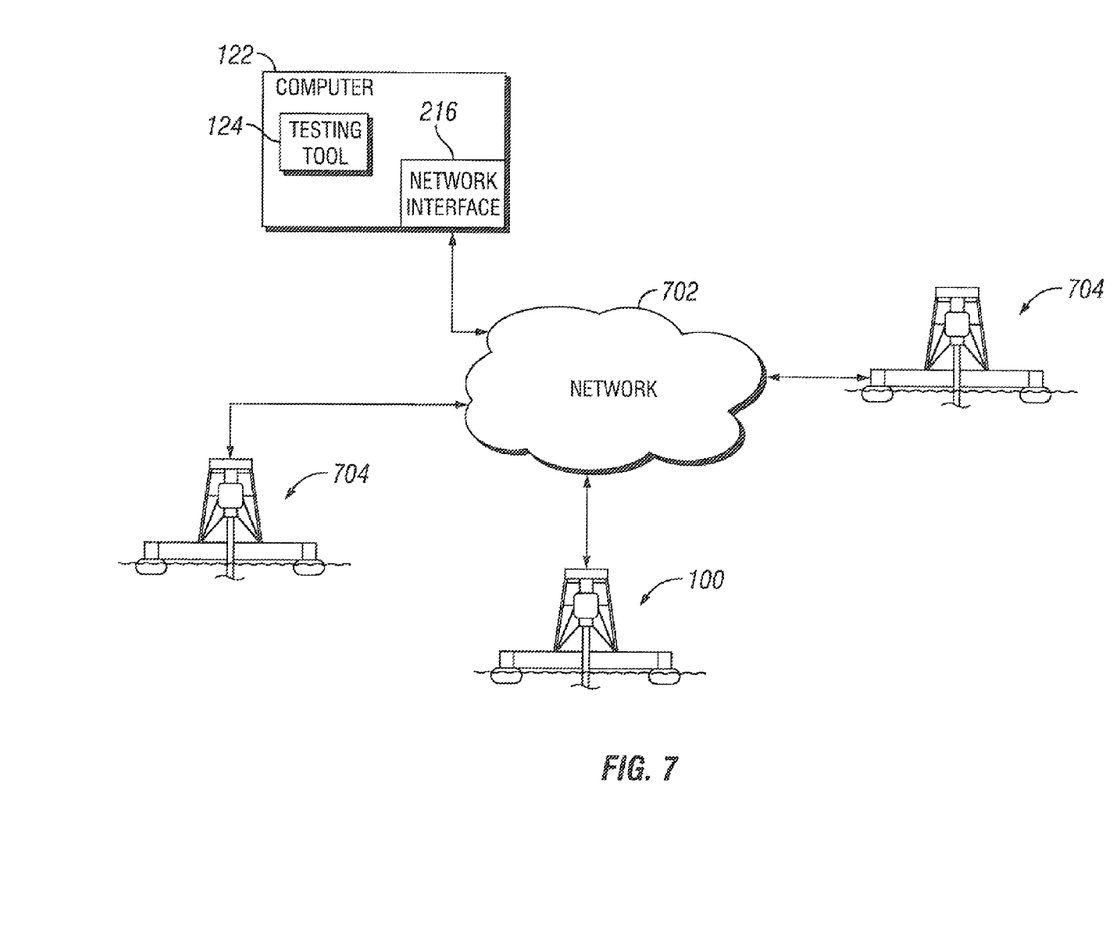
FIG. 7 is a generalized schematic diagram that illustrates another configuration of the computer system that includes the testing tool, according to aspects of the present disclosure.

In FIG. 1 described above, the computer 122 can be located at the well system 100. FIG. 7 is a generalized schematic diagram that illustrates another configuration of the computer system that includes the testing tool. While FIG. 7 illustrates various components associated with the computer 122, one skilled in the art will realize that FIG. 7 is exemplary and that additional components can be added and existing components can be removed.

As illustrated in FIG. 7, the computer 122 can be remotely located from the well system 100. The computer 122 can communicate with the well system 100, computers located at the well system 100, and the components of the well system 100 via a network 702. The network 702 can be any type of local-area network, wide-area network, and/or public network, such as the Internet. The computer 122 can utilize the network interface 216 to communicate with the well system 100, computers located at the well system 100, and the components of the well system 100 via a network 702 to perform the processes described above. Additionally, as illustrated, the computer 122 can be coupled to one or more geographically diverse well systems 704 via the network 702. As such, the computer 122, executing the testing tool 124, can perform the processes described above on any of the one or more additional well systems 704.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for testing components of a hydrocarbon well system, comprising:
    pressurizing, to a test pressure, a first supply line, a second supply line, and a component of the hydrocarbon well system coupled to the first supply line and the second supply line;
    isolating the first supply line from the second supply line and the component;
    measuring first changes in the test pressure in the first supply line over a period of time and second changes in the test pressure in the second supply line and the component over the period of time;
    subtracting the first changes from the second changes to determine test changes in the test pressure in the component; and
    analyzing the test changes in the test pressure to determine a pressure integrity of the component.

2. The method of claim 1, the method further comprising: testing the integrity of the first supply line prior to pressurizing the first supply line.

3. The method of claim 1, the method further comprising: testing the integrity of the second supply line prior to pressurizing the second supply line.

4. The method of claim 1, wherein the component of the hydrocarbon well system comprises at least one of a well head and a portion of a blowout preventer.

5. The method of claim 1, wherein the first supply line comprises a kill line and the second supply line comprises a choke line.

6. The method of claim 1, wherein analyzing the test change in the test pressure comprises determining whether the test changes in the test pressure reach a steady state.

7. A method for testing a component of a well system that is coupled to a first supply line and a second supply line, wherein the first supply line, the second supply line, and the component are pressurized to a test pressure, the method comprising:
    obtaining first data that indicates first pressure changes in the first supply line over a period of time after being pressurized to the test pressure, wherein the first supply line is isolated from the second supply line and the component after being pressurized to the test pressure;
    obtaining second data that indicates second pressure changes in the second supply line and the component over the period of time after being pressurized to the test pressure;
    subtracting, by a processor, the first data that indicates the first pressure changes from the second data that indicates the second pressures change to determine test pressure changes in the component; and
    analyzing, by the processor, the test pressure changes to determine a pressure integrity of the component.

8. The method of claim 7, wherein obtaining the first data that indicates the first pressure changes comprises one of retrieving the first data from a computer readable storage medium or reading the first data from a sensor coupled to the first supply line.

9. The method of claim 7, wherein obtaining the second data that indicates the second pressure changes comprises one of retrieving the second data from a computer readable storage medium or reading the second data from a sensor coupled to the second supply line and the component.

10. The method of claim 7, the method further comprising: controlling a pump to pressurize the first supply line, the second supply line, and the component to the test pressure.

11. The method of claim 7, the method further comprising: controlling at least one valve to isolate the first supply line from the second supply line and the component.

12. A system for testing components of a hydrocarbon well system, comprising:
    a computer readable storage medium storing instructions; and
    a processor configured to execute the instructions to perform a method comprising:
        pressurizing, to a test pressure, a first supply line, a second supply line, and a component of the hydrocarbon well system coupled to the first supply line and the second supply line;
        isolating the first supply line from the second supply line and the component;
        measuring first changes in the test pressure in the first supply line over a period of time and second changes in the test pressure in the second supply line and the component over the period of time;
        subtracting the first changes from the second changes to determine test changes in the test pressure in the component; and
        analyzing the test changes in the test pressure to determine a pressure integrity of the component.

13. The system of claim 12, wherein the processor is configured to execute the instructions to perform the method further comprising: testing the integrity of the first supply line prior to pressurizing the first supply line.

14. The system of claim 12, wherein the processor is configured to execute the instructions to perform the method further comprising: testing the integrity of the second supply line prior to pressurizing the second supply line.

15. The system of claim 12, wherein the component of the hydrocarbon well system comprises at least one of a well head and a portion of a blowout preventer.

16. The system of claim 12, wherein the first supply line comprises a kill line and the second supply line comprises a choke line.

17. The system of claim 12, wherein analyzing the test change in the test pressure comprises determining whether the test changes in the test pressure reach a steady state.

18. A system for testing a component of a well system that is coupled to a first supply line and a second supply line, wherein the first supply line, the second supply line, and the component are pressurized to a test pressure, comprising:
  a computer readable storage medium storing instructions; and
  a processor configured to execute the instructions to perform a method comprising:
    obtaining first data that indicates first pressure changes in the first supply line over a period of time after being pressurized to the test pressure, wherein the first supply line is isolated from the second supply line and the component after being pressurized to the test pressure;
    obtaining second data that indicates second pressure changes in the second supply line and the component over the period of time after being pressurized to the test pressure;
    subtracting the first data that indicates the first pressure changes from the second data that indicates the second pressures change to determine test pressure changes in the component; and
    analyzing the test pressure changes to determine a pressure integrity of the component.

19. The system of claim 18, wherein obtaining the first data that indicates the first pressure changes comprises one of retrieving the first data from the computer readable storage medium or reading the first data from a sensor coupled to the first supply line.

20. The system of claim 18, wherein obtaining the second data that indicates the second pressure changes comprises one of retrieving the second data from the computer readable storage medium or reading the second data from a sensor coupled to the second supply line and the component.

21. The system of claim 18, wherein the processor is configured to execute the instructions to perform the method further comprising: controlling a pump to pressurize the first supply line, the second supply line, and the component to the test pressure.

22. The system of claim 18, wherein the processor is configured to execute the instructions to perform the method further comprising: controlling at least one valve to isolate the first supply line from the second supply line and the component.

23. A non-transitory computer readable storage medium storing instructions for causing a processor to perform a method comprising:
  pressurizing, to a test pressure, a first supply line, a second supply line, and a component of a hydrocarbon well system coupled to the first supply line and the second supply line;
  isolating the first supply line from the second supply line and the component;
  measuring first changes in the test pressure in the first supply line over a period of time and second changes in the test pressure in the second supply line and the component over the period of time;
  subtracting the first changes from the second changes to determine test changes in the test pressure in the component; and
  analyzing the test changes in the test pressure to determine a pressure integrity of the component.

24. The non-transitory computer readable storage medium of claim 23, the method further comprising: testing the integrity of the first supply line prior to pressurizing the first supply line.

25. The non-transitory computer readable storage medium of claim 23, the method further comprising: testing the integrity of the second supply line prior to pressurizing the second supply line.

26. The non-transitory computer readable storage medium of claim 23, wherein the component of the hydrocarbon well system comprises at least one of a well head and a portion of a blowout preventer.

27. The non-transitory computer readable storage medium of claim 23, wherein the first supply line comprises a kill line and the second supply line comprises a choke line.

28. The non-transitory computer readable storage medium of claim 23, wherein analyzing the test change in the test pressure comprises determining whether the test changes in the test pressure reach a steady state.

29. A non-transitory computer readable storage medium storing instructions for causing a processor to perform a method, wherein a component of a well system is coupled to a first supply line and a second supply line, and wherein the first supply line, the second supply line, and the component are pressurized to a test pressure, the method comprising:
  obtaining first data that indicates first pressure changes in the first supply line over a period of time after being pressurized to the test pressure, wherein the first supply line is isolated from the second supply line and the component after being pressurized to the test pressure;
  obtaining second data that indicates second pressure changes in the second supply line and the component over the period of time after being pressurized to the test pressure;
  subtracting the first data that indicates the first pressure changes from the second data that indicates the second pressures change to determine test pressure changes in the component; and
  analyzing the test pressure changes to determine a pressure integrity of the component.

30. The non-transitory computer readable storage medium of claim 29, wherein obtaining the first data that indicates the first pressure changes comprises one of retrieving the first data from a computer readable storage medium or reading the first data from a sensor coupled to the first supply line.

31. The non-transitory computer readable storage medium of claim 29, wherein obtaining the second data that indicates the second pressure changes comprises one of retrieving the second data from a computer readable storage medium or reading the second data from a sensor coupled to the second supply line and the component.

32. The non-transitory computer readable storage medium of claim 29, the method further comprising: controlling a pump to pressurize the first supply line, the second supply line, and the component to the test pressure.

33. The non-transitory computer readable storage medium of claim 29, the method further comprising: controlling at least one valve to isolate the first supply line from the second supply line and the component.

* * * * *